United States Patent [19]

Toriumi et al.

[11] Patent Number: 4,665,408
[45] Date of Patent: May 12, 1987

[54] IMAGE RECORDING APPARATUS FOR TRANSPORTING PHOTOSENSITIVE FILM SHEET

[75] Inventors: Shiro Toriumi, Zama; Seiichi Yamagishi; Yukiyoshi Yamakoshi, both of Machida; Kenjiro Ishii, Sagamihara; Yutaka Maeda, Mitaka, all of Japan

[73] Assignee: Minolta Camera Kabushiki Kaisha, Osaka, Japan

[21] Appl. No.: 675,066

[22] Filed: Nov. 26, 1984

[30] Foreign Application Priority Data

Nov. 29, 1983 [JP] Japan ................... 58-225860
Nov. 30, 1983 [JP] Japan ................... 58-227192
Nov. 30, 1983 [JP] Japan ................... 58-227193

[51] Int. Cl.⁴ .................... G01D 15/28; G03G 15/00; B65H 9/06
[52] U.S. Cl. ................... 346/134; 346/76 L; 346/101 R; 355/3 SH; 355/14 SH; 271/245; 271/269; 271/271; 271/233
[58] Field of Search .............. 346/76 L, 136, 134, 346/107 R; 355/3 R, 3 SH, 14 SH, 72; 271/233, 245, 246, 269, 270, 271

[56] References Cited

U.S. PATENT DOCUMENTS

| 4,417,801 | 11/1983 | Eisemann | 355/3 SH |
| 4,440,387 | 4/1984 | Inoma et al. | 271/245 |
| 4,465,272 | 8/1984 | Kajita et al. | 271/246 |
| 4,492,455 | 1/1985 | Kawai | 355/3 R |

Primary Examiner—E. A. Goldberg
Assistant Examiner—Gerald E. Preston
Attorney, Agent, or Firm—Wenderoth, Lind & Ponack

[57] ABSTRACT

A transport mechanism for transporting a photosensitive film sheet for use in an image recording apparatus, including an auxiliary scanning drum, a nip roller held in contact with the auxiliary scanning drum, a support plate extending substantially horizontally in a sheet transport path, a push lever provided at one end of the support plate and a stopper provided at the other end of the support plate.

9 Claims, 21 Drawing Figures

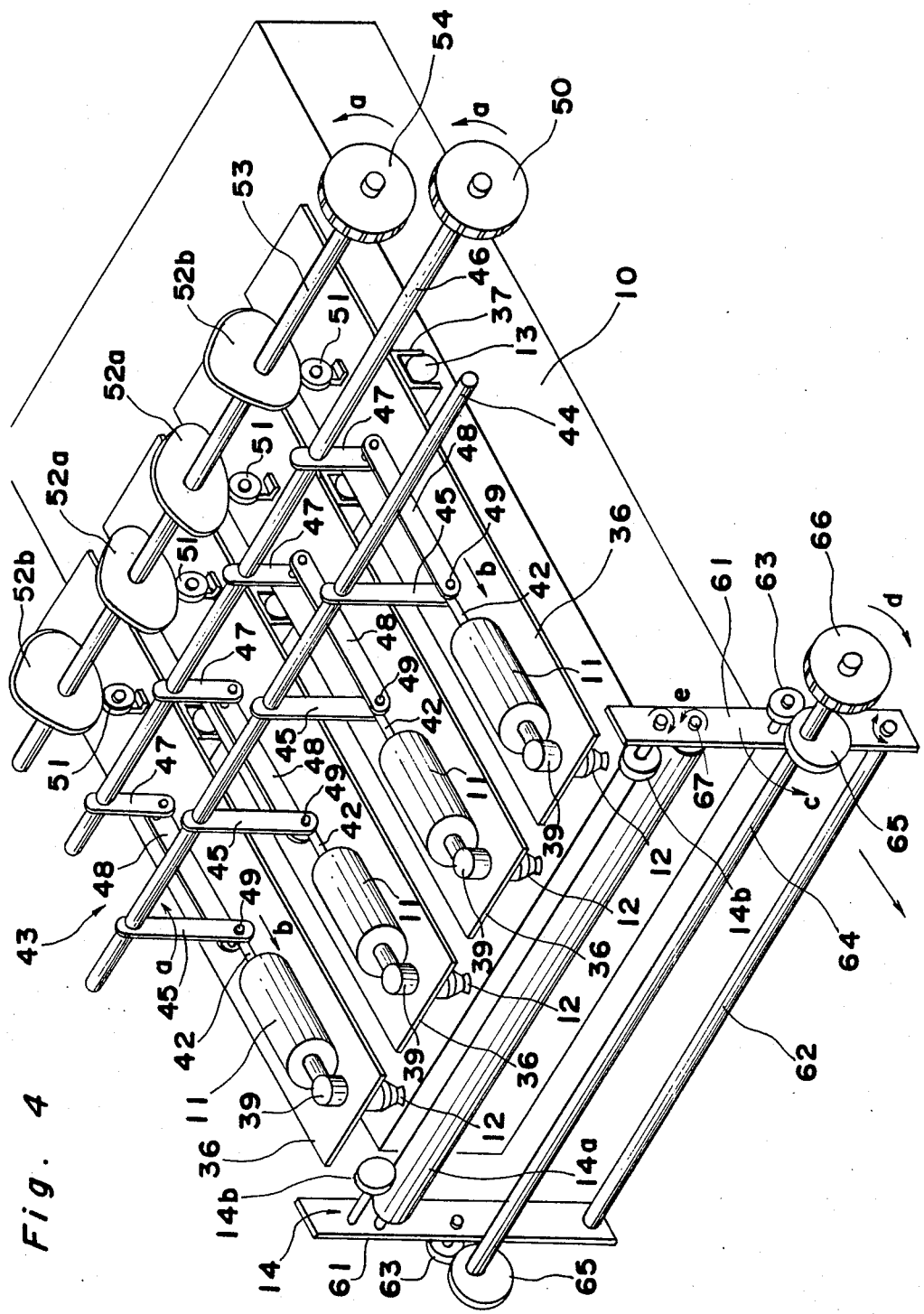

---- Upper limit
---- Lower limit

---- Intermediate Point

IMAGE RECORDING APPARATUS FOR TRANSPORTING PHOTOSENSITIVE FILM SHEET

BACKGROUND OF THE INVENTION

The present invention generally relates to image recording apparatuses and more particularly, to a transport mechanism for transporting photosensitive film sheets for use in an image recording apparatus of a laser beam type in which images are formed on the photosensitive film sheets by using laser beams.

Conventionally, there has been proposed for example, an image recording apparatus of this kind as shown in FIG. 1. The known apparatus includes a magazine 1 having photosensitive film sheets S stacked thereon, a suction means 2, a pair of nip rollers 3, an auxiliary scanning drum 4, a pair of nip rollers 5, a stopper 6 and a laser beam unit 7. The film sheets S are taken up from the magazine 1 one sheet at a time by the suction means 2 so as to fall down between the auxiliary scanning drum 4 and the nip rollers 5 through the nip rollers 3. Then, the stopper 6 is retracted from the auxiliary scanning drum 4 and, at the same time, the nip rollers 5 are brought into pressing contact with the auxiliary scanning drum 4 through the fallen film sheet S. Thus, when the film sheet S is being transported downwardly by a rotational force of the auxiliary scanning drum 4 which is rotated at all times, scanning of the laser beams is performed on the film sheet S by using laser beams irradiated from the laser beam unit 7 and thus, the images are formed on the film sheet S. Meanwhile, in sheet transport mechanisms for use in image recording apparatuses of this kind, in order to eliminate inaccurate scanning employing laser beams, it is generally necessary to eliminate unstable transport of the film sheet and transport the film sheet by positioning the film sheet accurately. However, in the known apparatus of FIG. 1, since it is so arranged that the film sheets S fall down by their own weight, it is difficult to accurately position the film sheets S due to variations in weight of the film sheets S or deflection of the film sheets S. Furthermore, in the known apparatus, the auxiliary scanning drum 4 is continuously rotated so as to prevent irregular rotation of the auxiliary scanning drum 4. However, since the nip rollers 5 are brought into and out of contact with the auxiliary scanning drum 4, torque of the drum 4 varies at the time of pressing contact of the nip rollers 5 with the drum 4, so that irregular rotation of the drum 4 takes place, thereby resulting in unstable transport of the film sheets S. Since even minute instability of transport of the film sheets S strongly affects reproducibility of the images in the case where an original having continuous tone, e.g., an X-ray film is reproduced, it is highly important to eliminate unstable transport of the film sheets S.

SUMMARY OF THE INVENTION

Accordingly, an essential object of the present invention is to provide an improved transport mechanism for transporting photosensitive film sheets for use in an image recording apparatus, in which the photosensitive film sheets can be transported onto an auxiliary scanning drum after having been positioned accurately and unstable transport of the photosensitive film sheets on the auxiliary scanning drum does not take place, with substantial elimination of the disadvantages inherent in conventional transport mechanisms of this kind.

In accomplishing these and other objects according to one preferred embodiment of the present invention, there is provided an improved transport mechanism for transporting a photosensitive film sheet for use in an image recording apparatus including a supply means for supplying said photosensitive film sheet to said transport mechanism, said transport mechanism comprising: an auxiliary scanning drum which is continuously rotated at a constant speed; said image recording apparatus effecting, by using laser beams, main scanning of image signals on said photosensitive film sheet which is being transported on said auxiliary scanning drum at the constant speed; a nip roller which is at all times brought into contact with said auxiliary scanning drum so as to be rotated by said auxiliary scanning drum; a support plate which is substantially horizontally provided in a sheet transport path so as to extend from said supply means to said auxiliary scanning drum such that said photosensitive film sheet is slidably moved on said support plate; a push lever which is provided at one end of said support plate adjacent to said supply means so as to be projected into and retracted away from said sheet transport path such that said push lever urges forwardly a trailing edge of said photosensitive film sheet when said push lever is projected into said sheet transport path; and a stopper which is provided at the other end of said support plate adjacent to said auxiliary scanning drum so as to be projected into and retracted away from said sheet transport path such that said stopper positions a leading edge of said photosensitive film sheet when said stopper is projected into said sheet transport path; said photosensitive film sheet supplied from said supply means onto said support plate being displaced by said push lever so as to to be positioned on said support plate through contact of said leading edge with said stopper when said push lever is initially projected into said sheet transport path; said photosensitive film sheet positioned on said support plate being displaced by said push lever so as to be gripped, at said leading edge, between said auxiliary scanning drum and said nip roller when said push lever is again projected into said sheet transport path.

Namely, since the photosensitive film sheets are slid on the substantially horizontal support plate, there has been difficulty in accurately positioning the film sheets due to variations of weight of the film sheets or deflection of the film sheets. The film sheet, which is positioned accurately immediately before the auxiliary scanning drum by the stopper through contact of the stopper with the leading edge of the film sheet, is inserted, by an urging force of the push lever, between the auxiliary scanning drum and the nip roller both rotating continuously through contact therebetween. Accordingly, the film sheet is prevented from coming into contact with the stopper or the push lever when the film sheet is being transported by the auxiliary scanning drum. Thus, in accordance with the present invention, unstable transport of the film sheets does not take place through elimination of variations of load of the auxiliary scanning drum.

BRIEF DESCRIPTION OF THE DRAWINGS

These and other objects and features of the present invention will become apparent from the following description taken in conjunction with the preferred embodiment thereof with reference to the accompanying drawings, in which:

FIG. 4 is a perspective view of a suction mechanism and a feed mechanism which are employed in the image recording apparatus of FIG. 2;

Before the description of the present invention proceeds, it is to be noted that like parts are designated by like reference numerals throughout several views of the accompanying drawings.

DETAILED DESCRIPTION OF THE INVENTION

Figure 1:
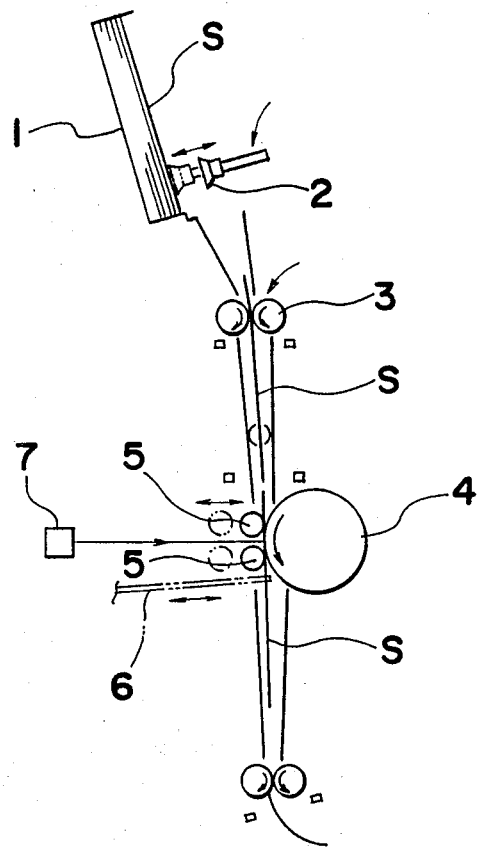
FIG. 1 is a fragmentary schematic view of a prior art image recording apparatus (already referred to)
Figure 2:
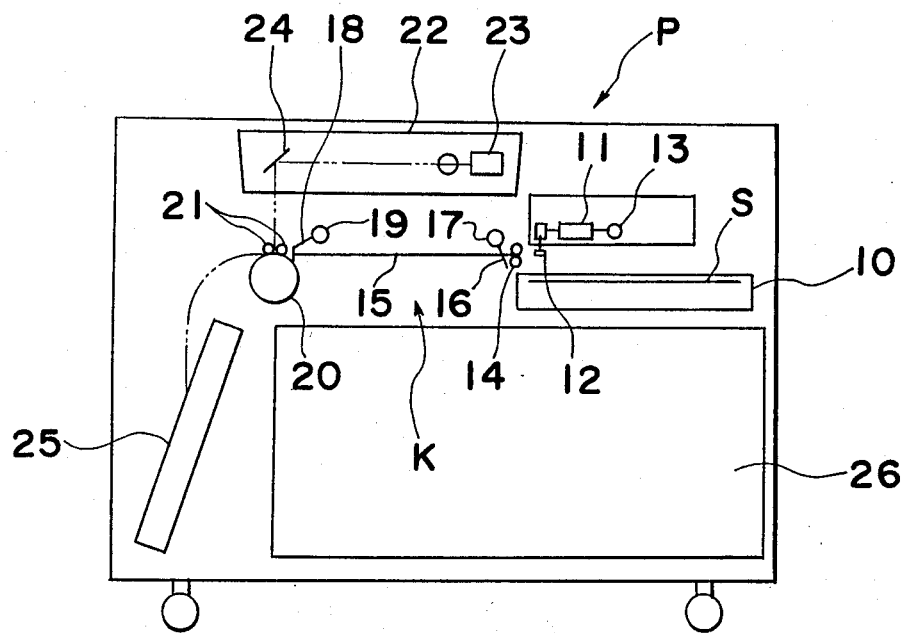
FIG. 2 is a schematic view of an image recording apparatus in which a transport mechanism according to the present invention is incorporated.

Referring now to the drawings, there is shown in FIG. 2, an image recording apparatus P in which a transport mechanism K for transporting photosensitive film sheets S, according to the present invention is incorporated. The film sheets S are stacked on one another in a supply cassette 10 such that photosensitive faces of the film sheets S are oriented upwardly. A suction pad 12 connected with an air cylinder 11 is pivotally provided above leading edges of the film sheets S so as to be pivoted about a shaft 13 upwardly and downwardly together with the air cylinder 11. When the suction pad 12 has been pivoted downwardly, the suction pad 12 sucks up the film sheets S through an air sucking operation of the air cylinder 11 so as to lift up an uppermost one of the film sheets S. Furthermore, a pair of feed rollers 14 are movably provided so as to be moved in the leftward and rightward directions in FIG. 2 at a height substantially equal to that of the leading edge of the film sheet S lifted up by the suction pad 12.

The transport mechanism K generally includes a support plate 15, a push lever 16, a stopper 18, an auxiliary scanning drum 20 and a pair of nip rollers 21. In response to a transport start signal for starting transport of the film sheet S, the feed rollers 14 are moved in the rightward direction in FIG. 2 while being rotated and thus, grip therebetween the lifted film sheet S so as to feed the film sheet S onto the support plate 15 immediately. It is to be noted that rotation of the feed rollers 14 is stopped at the time when the film sheet S has been fed onto the support plate 15. The above described stopping of rotation of the feed rollers 14 is performed so as to prevent, so much as possible, unstable transport of the film sheet S due to its vibration resulting from drive of the feed rollers 14. The support plate 15 is horizontally provided in a sheet transport path so as to extend from the feed rollers 14 to the auxiliary scanning drum 20.

The support plate 15 has a length slightly larger than that of the film sheet S and an upper face of the support plate 15 is so finished as to allow the film sheet S to slide thereon. The push lever 16 is pivotally provided at one end of the support plate 15 adjacent to the feed rollers 14 and is pivoted about a shaft 17 so as to be projected into and retracted away from the sheet transport path. Meanwhile, the stopper 18 is pivotally provided at the other end of the support plate 15 adjacent to the auxiliary scanning drum 20 and is pivoted about a shaft 19 so as to be projected into and retracted away from the sheet transport path. When the push lever 16 is pivoted in the clockwise direction in FIG. 2 so as to be projected into the sheet transport path, the push lever 16 urges the trailing edge of the film sheet S forwardly. The stopper 18 has a hooked end. When the stopper 18 is pivoted in the counterclockwise direction in FIG. 2 so as to be projected into the sheet transport path, the leading edge of the film sheet S is brought into contact with the hooked end of the stopper 18 and thus, the film sheet S is accurately positioned on the support plate 15 by the stopper 18. The film sheet S is finally pushed in the leftward direction in FIG. 2 by the push lever 16 so as to be gripped between the auxiliary scanning drum 20 and the nip rollers 21, which operation will be described in detail hereinbelow.

The auxiliary scanning drum 20 is continuously rotated in the counterclockwise direction in FIG. 2 during a recording operation of the image recording apparatus P, while the nip rollers 21 are at all times brought into contact with the auxiliary scanning drum 20 so as to be rotated by the auxiliary scanning drum 20. As soon as the film sheet S is gripped between the auxiliary scanning drum 20 and the nip rollers 21, the film sheet S is transported in the leftward direction in FIG. 2 by a rotational force of the auxiliary scanning drum 20.

The image recording apparatus P further includes a laser beam unit 22 disposed above the support plate 15. The laser beam unit 22 includes a beam generator 23 and a reflecting mirror 24. Laser beams generated from the beam generator 23 are irradiated between the nip rollers 21 so as to perform main scanning on the photosensitive film sheet S transported on the auxiliary scanning drum 20 such that a predetermined image is formed on the film sheet S. The film sheet S, having the image thus formed thereon, is carried from between the auxiliary scanning drum 20 and the nip rollers 21 and then, falls down into a take-up cassette 25 by its own weight. In order to positively shield the film sheets S in the take-up cassette 25 from light, the take-up cassette 25 is provided with a light shielding cover which is so driven as to cover and uncover an opening of the take-up cassette 25 upon detection of transport of the film sheet S. Since the film sheets S accommodated in the take-up cassette 25 have been subjected to exposure only, the take-up cassette 25 containing the exposed film sheets S is taken out of the image recording apparatus P such that the exposed film sheets S are subsequently processed by a developing device and a fixing device.

Figure 3A:
FIGS. 3a to 3f are views explanatory of operations of the transport mechanism of FIG. 2.
Figure 3B:
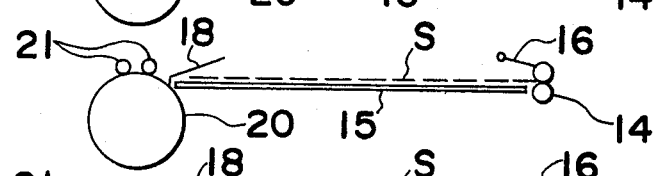
Figure 3C:
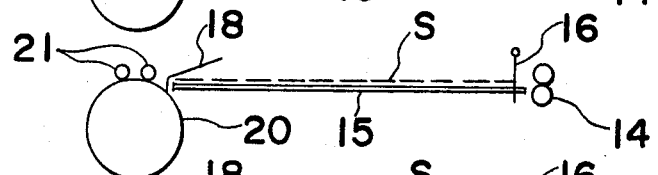
Figure 3D:
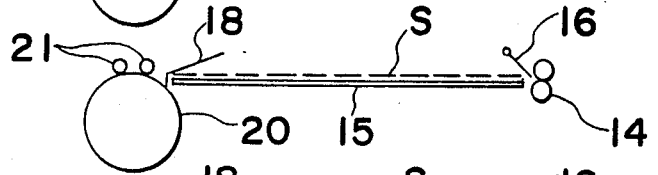
Figure 3E:
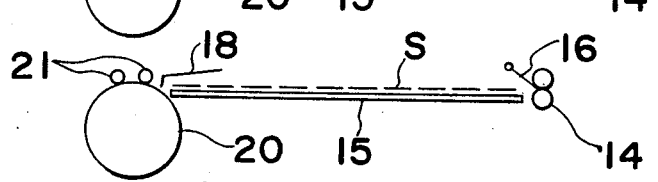
Figure 3F:
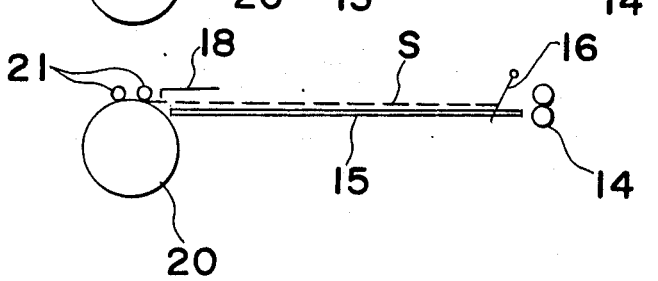

Hereinbelow, operations of the transport mechanism K will be described with reference to FIG. 3. Initially, when the film sheet S is being carried onto the support plate 15 by the feed rollers 14, the push lever 16 is upwardly retracted away from the sheet transport path and the stopper 18 is projected into the sheet transport path as shown in FIG. 3a. Then, when the film sheet S has been carried onto the support plate 15 by the feed rollers 14 as shown in FIG. 3b, the push level 16 is pivoted in the clockwise direction so as to urge the trailing edge of the film sheet S forwardly as shown in FIG. 3c. At this time, the leading edge of the film sheet S is brought into contact with the stopper 18 and thus, a central portion of the film sheet S is deflected slightly upwardly by an urging force of the push level 16. Subsequently, the push lever 16 is pivoted in the counterclockwise direction so as to be retracted away from the trailing edge of the film sheet S as shown in FIG. 3d. Thus, the film sheet S is placed in a flat state on the support plate 15 and the leading edge of the film sheet S is accurately positioned by the stopper 18. Meanwhile, it is to be noted that the push lever 16 is required to be retracted away from the sheet transport path relatively slowly. Namely, in the case where the push lever 16 is retracted away from the sheet transport path rapidly, such an undesirable phenomenon takes place that the leading edge of the film sheet S is separated away from the stopper 18 when the film sheet S deflected by the urging force of the push lever 16 restores the flat state by its own elasticity. Thereafter, the stopper 18 is pivoted in the clockwise direction so as to be retracted away from the sheet transport path as shown in FIG. 3e and then, the push lever 16 is again pivoted in the clockwise direction so as to push forwardly the trailing edge of the film sheet S as shown in FIG. 3f. Thus, since the film sheet S is slid on the support plate 15, the leading edge of the film sheet S is gripped between the rotating auxiliary scanning drum 20 and the rotating nip rollers 21 such that the film sheet S is subsequently transported by the rotational force of the auxiliary scanning drum 20.

It should be noted that drive of the push lever 16 and the stopper 18 is controlled by a sequence circuit or a microcomputer through a combination of detection signals of the film sheet S and timers. These control devices are provided in a control cabinet 26 together with other control components.

It should be further noted that the transport mechanism of the present invention can be modified in various ways. For example, it can also be arranged such that the push lever 16 and the stopper 18 are projected into the sheet transport path from below.

As is clear from the foregoing description, in accordance with the present invention, since the photosensitive film sheet is slid on the substantially horizontal support plate, inaccurate positioning of the film sheets due to variations in weight of the film sheets or from deflection of the film sheets is avoided and the leading edge of the film sheet can be accurately positioned immediately before the auxiliary scanning drum through operative association of the push lever with the stopper.

Furthermore, in accordance with the present invention, since the auxiliary scanning drum is at all times rotated continuously in contact with the nip rollers and the film sheet does not come into contact with the stopper, the push lever, etc. during transport of the film sheet on the auxiliary scanning drum, load of the auxiliary scanning drum does not vary and thus, unstable transport of the film sheets is eliminated, thereby producing images of high quality.

Figure 5:
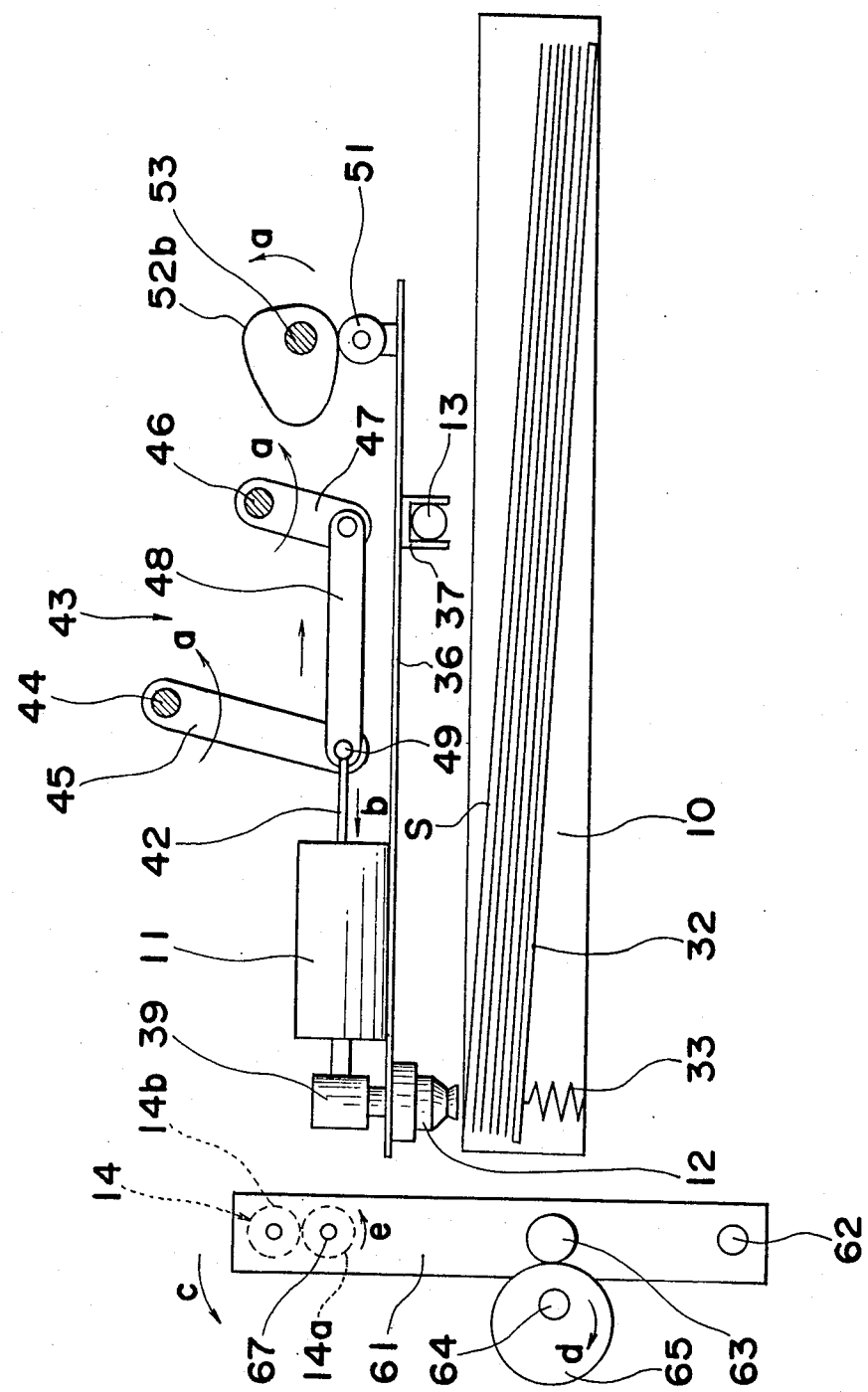
FIGS. 5 and 6 are views explanatory of operations of the suction mechanism and the feed mechanism of FIG. 4.

Hereinbelow, a suction mechanism and a feed mechanism both employed in the image recording apparatus P will be described with reference to FIGS. 4 to 11. Initially, the suction mechanism is described with reference to FIGS. 4 to 7. In the suction mechanism, the supply cassette 10, which is sufficiently shielded from light, is so provided as to be drawn out of the image recording apparatus P. A plurality of the photosensitive film sheets S are placed on a retainer plate 32 in the supply cassette 10. The retainer plate 32 is raised, at one end thereof, by a spring 33 such that the uppermost one of the film sheets S is maintained at a predetermined height regardless of increase or decrease of the number of the film sheets S stacked on the retainer plate 32. In this embodiment, the suction mechanism includes four air cylinders 11 each having piston rod 42 and four suction pads 12 attached to lower faces of four holder plates 36, respectively. Four brackets 37 are, respectively, secured to the lower faces of the holder plates 36 and the holder plates 36 are pivotally mounted on the shaft 13 through the brackets 37. Namely, the four suction pads 12 are provided independently of each other in a widthwise direction of the sheet transport path so as to be pivoted about the shaft 13 upwardly and downwardly. Each of the suction pads 12 is communicated, via an adaptor 39, with a chamber 41 (FIG. 8) of each air cylinder 11 provided on each holder plate 36. Meanwhile, one end of each piston rod 42, which is urged by a return spring (not shown) in the direction indicated by the arrow b in FIGS. 4 and 5, is coupled with a link means 43.

The link means 43 includes four links 45 rotatably mounted on a shaft 44, four links 47 secured to a driving shaft 46, and four links 48 for coupling the links 45 with the lnks 47, respectively. Each piston rod 42 is coupled with a coupling pin 49 for coupling each link 45 with each link 48. Furthermore, a gear 50 is mounted on one end portion of the driving shaft 36 through a one-way clutch adapted to be turned on and off so as to transmit to the driving shaft 46 a rotational force oriented only in the direction indicated by the arrow a. Namely, when the gear 50 is driven so as to be rotated in the direction of the arrow a, the links 47 are rotated in the direction of the arrow a together with the driving shaft 46, so that the links 45 are also rotated in the direction of the arrow a in operative association with the links 48. Thus, since the piston rods 42 are moved in the direction opposite to that of the arrow b, the chambers 41 of the air cylinders 11 are set at a negative pressure and thus, the negative pressure prevails in the suction pads 12 communicating with the chambers 41, respectively. Meanwhile, when transmission of the rotational driving force from the gear 50 to the driving shaft 46 is stopped, the piston rods 42 are returned in the direction of the arrow b by an urging force of the return springs, thereby resulting in cancellation of the negative-pressure state of the chambers 41.

Furthermore, four rollers 51 are rotatably mounted on one end portion of each holder plate 36. A pair of inner cams 52a and a pair of outer cams 52b are secured to a driving shaft 53 so as to be, respectively, disposed above the rollers 51 such that the inner cams 52a are interposed between the outer cams 52b in the widthwise direction of the sheet transport path. A gear 54 is mounted on one end portion of the driving shaft 53 through a one-way clutch adapted to be turned on and off so as to transmit to the driving shaft 53 a rotational force oriented only in the direction indicated by the arrow a. Since a left portion of the suction mechanism is heavier than a right portion thereof with respect to the holder plates 36 in FIG. 5, the holder plates 36 are so urged as to be pivoted about the shaft 13 in the counterclockwise direction in FIG. 5, so that the rollers 51 are, respectively, brought into contact with outer peripheral faces of the inner cams 52a and the outer cams 52b and thus, the holder plates 36 are prevented from being pivoted further at a certain pivotal angle. Accordingly, when the rotational driving force is transmitted from the gear 54 to the driving shaft 53 so as to rotate the inner cams 52a and the outer cams 52b in the direction of the arrow a together with the driving shaft 53, the holder plates 36 are pivoted about the shaft 13 in accordance with configurations of the outer peripheral faces of the inners cams 52a and the outer cams 52b, respectively.

Figure 6:
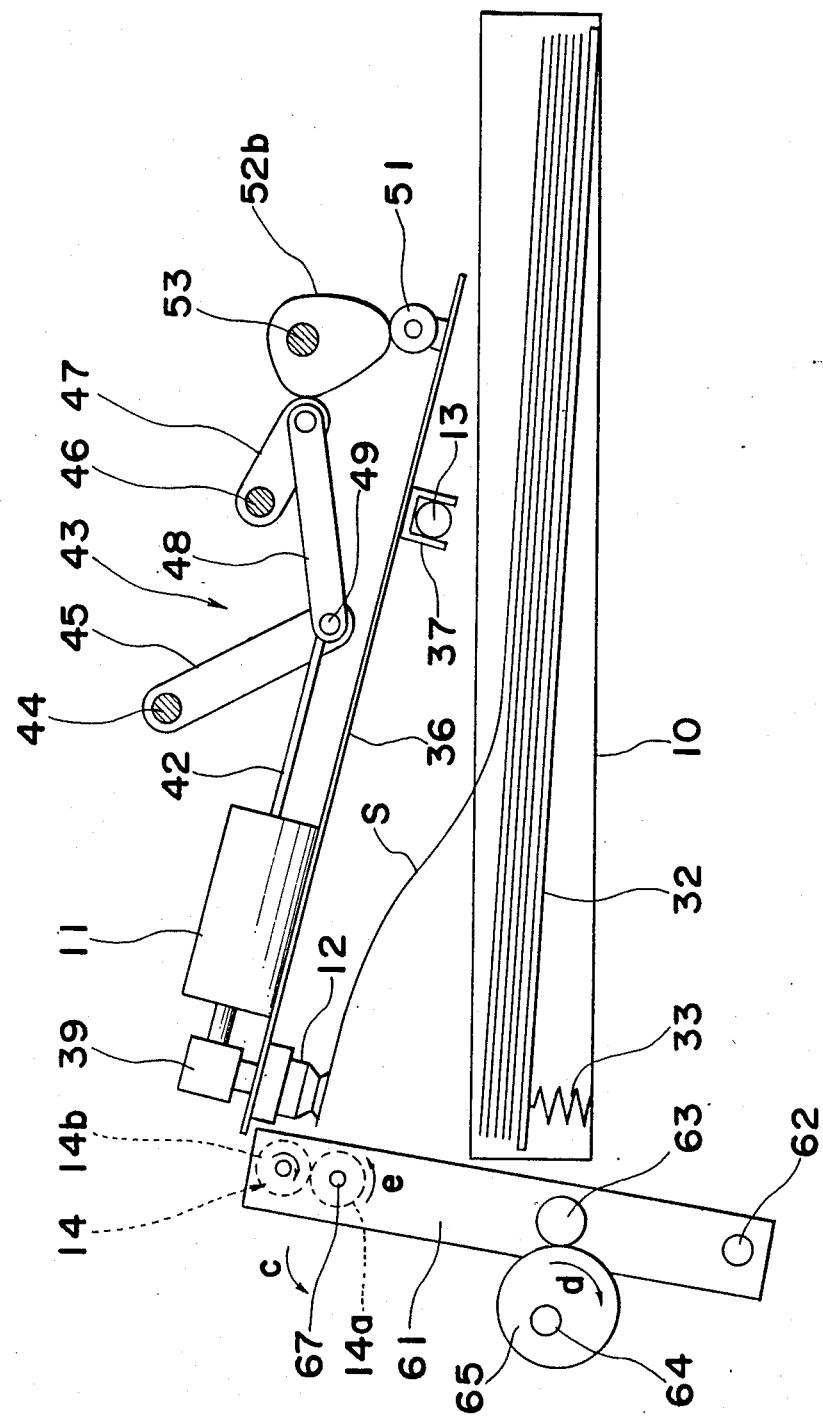
Figure 7:
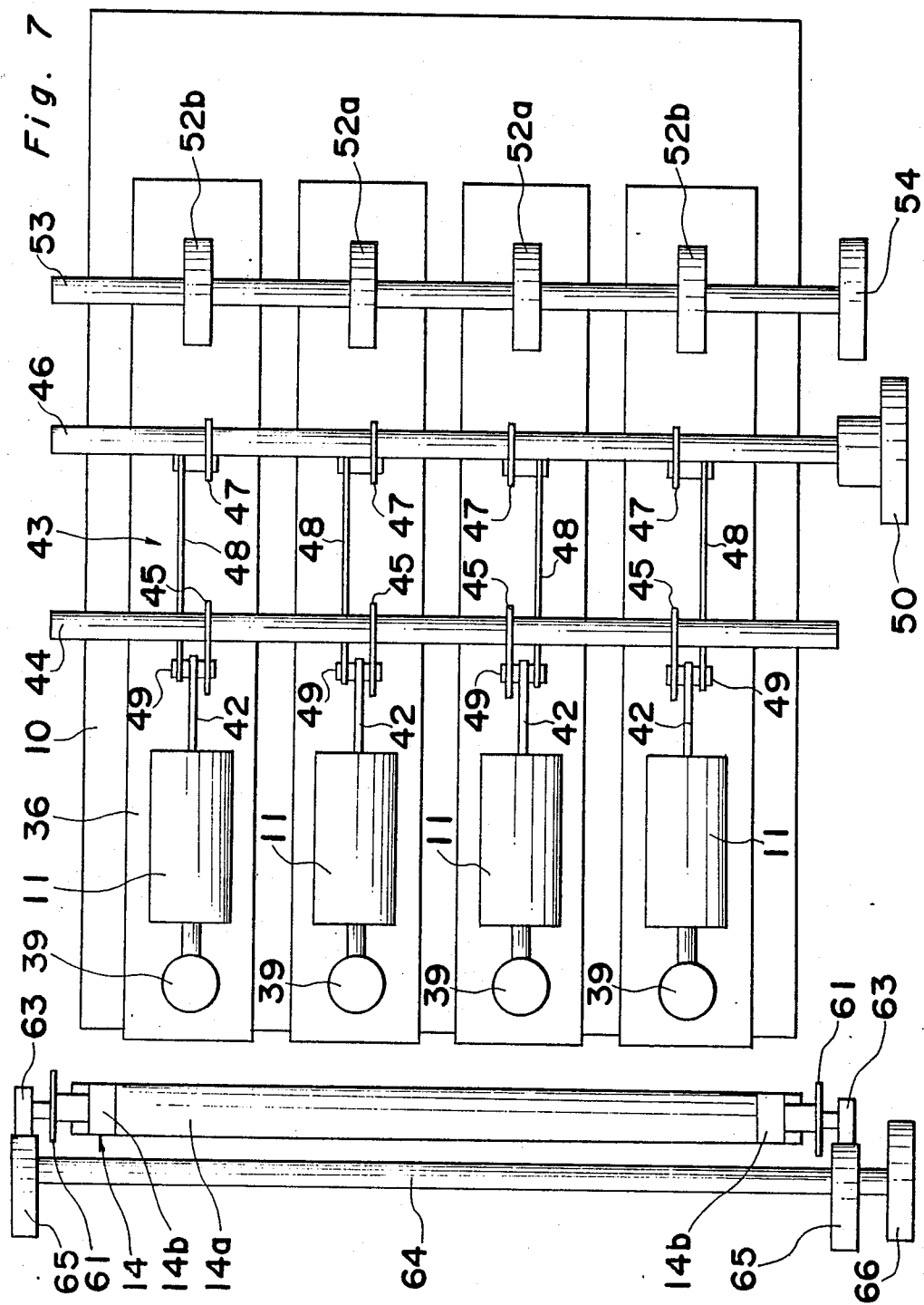
FIG. 7 is a top plan view of the suction mechanism and the feed mechanism of FIG. 4.
Figure 8:
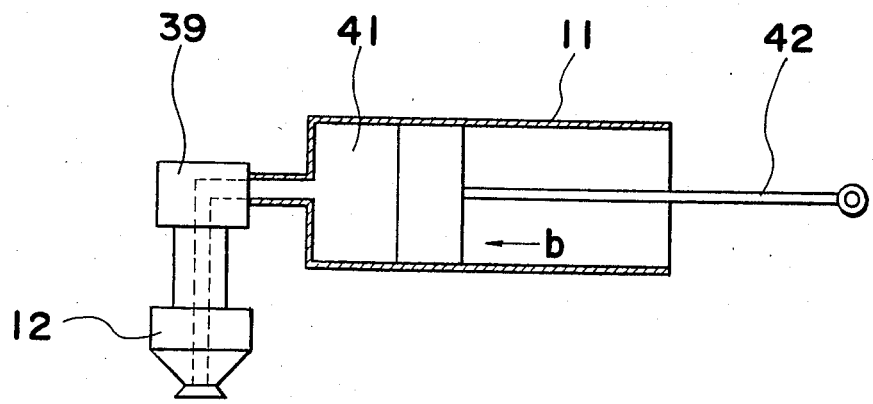
FIG. 8 is a cross-sectional view of an air cylinder employed in the suction mechanism of FIG. 4.
Figures 9A, 9B:
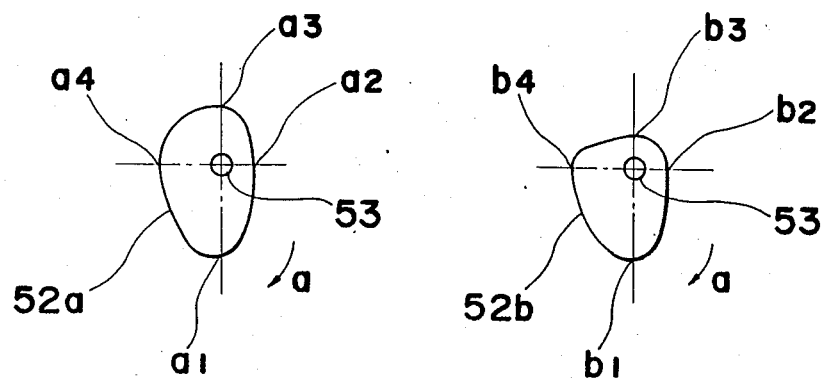
FIGS. 9a, 9b and 10 are front elevational views of cams employed in the suction mechanism of FIG. 4.

Referring to FIGS. 9a and 9b, there are shown the configurations of the inner cams 52a and the outer cams 52b, respectively. Each of the inner cams 52a and the outer cams 52b effects one complete rotation during each printing operation so as to pivot each suction pad 12 upwardly and downwardly upon one reciprocating pivotal movement of each holder plate 36 such that the leading edge of the uppermost one of the photosensitive film sheets S stacked in the supply cassette 10 is lifted up through sucking thereof by the suction pads 12 as shown in FIG. 6, which operation will be described later.

Next, the feed mechanism will be described, hereinbelow. The feed mechanism includes a pair of feed rollers 14. The feed rollers 14 are constituted by an elongated rollers 14a and a pair of plate-like rollers 14b held in contact with opposite end portions of the roller 14a, respectively. The rollers 14a and 14b are rotatably mounted on a pair of frames 61 confronting each other. The frames 61 are rotatably supported, at lower ends thereof, by a shaft 62 and are urged at all times in the direction indicated by the arrow c in FIG. 4 by springs (not shown). A pair of rollers 63 are, respectively, mounted on central portions of opposite outer faces of the frames 61. It is so arranged that pivotal movements of the frames 61 are regulated at a certain pivotal angle through contact of the rollers 63 with a pair of cams 65 secured to a driving shaft 64. Furthermore, a gear 66 is mounted on one end portion of the driving shaft 64 through a one-way clutch adapted to be turned on and off so as to transmit to the driving shaft 64 a rotational force oriented only in the direction indicated by the arrow d in FIG. 4. Moreover, since a pulley, a timing belt, etc. (not shown) for transmitting the rotational force of the driving shaft 64 are provided at one end of the shaft 62 and at one end of a rod portion 67 of the roller 14a, the roller 14a is driven for rotation thereof in the direction indicated by the arrow e in FIG. 4 and the rollers 14b in contact with the roller 14a are rotated by the roller 14a.

Namely, each time the cam 65 is rotated, the frames 61 effect one reciprocating pivotal movement about the shaft 62, so that the feed rollers 14 are moved toward and away from the suction pads 12 at a height substantially equal to that of the leading edge of the film sheet S lifted up by the suction pads 12. When the feed rollers 14 are moved in the direction opposite to that of the arrow c in FIG. 4, the feed rollers 14 grip therebetween the leading edge of the film sheet S lifted up by the suction pads 12 so as to feed the film sheet S onto the support plate 15 by the rotational force of the feed rollers 14.

Figure 10:
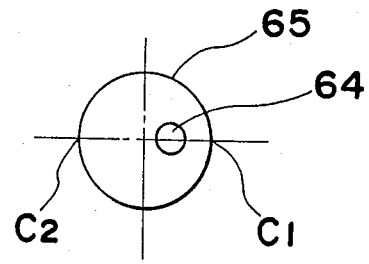
Figure 11A:
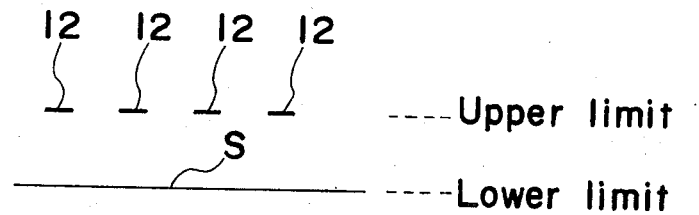
FIGS. 11a to 11e are views explanatory of operations of a suction pad employed in the suction mechanism of FIG. 4.
Figure 11B:
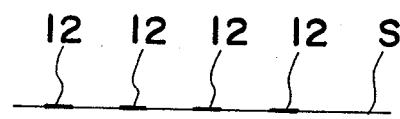

Hereinbelow, operations of the suction mechanism and the feed mechanism will be described with reference to FIGS. 9 to 11. Initially, at the time of the start of the sucking operation of the suction mechanism, points a1 and b1 (FIGS. 9a and 9b) lying on the outer peripheral faces of the inner cams 52a and the outer cams 52b, respectively, are brought into contact with the rollers 51 and the holder plates 36 are pivoted about the shaft 13 in the clockwise direction in FIG. 5, so that the suction pads 12 are positioned at an upper limit of their stroke as shown in FIG. 11a. In response to a supply start signal for starting supply of the film sheets S, the one-way clutch of the gear 54 is initially turned on so as to rotate the inner cams 52a and the outer cams 52b in the direction of the arrow a. When the inner cams 52a and the outer cams 52b are rotated through 90° in the direction of the arrow a, points a2 and b2 lying on the outer peripheral faces of the inner cams 52a and the outer cams 52b, respectively are brought into contact with the rollers 51 and the suction pads 12 are positioned at a lower limit of their stroke such that the suctions pads 12 are brought into contact with the upper face of the uppermost one of the film sheets S stacked in the supply cassette 10 as shown in FIG. 11b. At this time, the one-way clutch of the gear 50 is turned on to rotate the driving shaft so as to pivot the links 47 in the direction of the arrow a, so that the piston rods 42 are moved in the direction opposite to that of the arrow b and thus, the chambers 41 of the air cylinders 11 are set at a negative pressure, whereby the leading edge of the uppermost one of the film sheets S is sucked up by the suction pads 12.

Figure 11C:
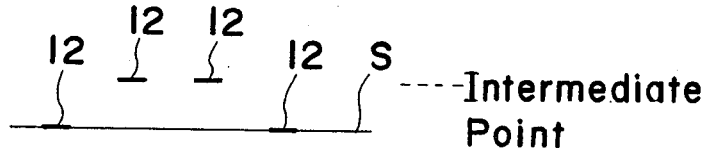

Subsequently, when the inner cams 52a and the outer cams 52b are further rotated through 90° in the direction of the arrow a, points a3 and b3 lying on the outer peripheral faces of the inner cams 52a and the outer cams 52b, respectively, are brought into contact with the rollers 51. Since a section of each of the outer cams 52b, which extends from the point b2 to the point b3, has a constant radius of curvature, the holder plates 36 corresponding to the outer cams 52b are not pivoted, so that the suction pads 12 corresponding to the outer cams 52b are held at the lower limit of their stroke. On the other hand, since a section of each of the inner cams 52a, which extends from the point a2 to the point a3, has radii of curvature increasing gradually in a path proceeding from the point a2 to the point a3, the the holder plates 36 corresponding to the inner cams 52a are pivoted about the shaft 13 in the clockwise direction in FIG. 5, so that the suction pads 12 corresponding to the inner cams 52a are raised to an intermediate point of their stroke as shown in FIG. 11c. Thus, since a central portion of the leading edge of the uppermost one of the film sheets S is lifted up by the suction pads 12 corresponding to the inner cams 52a and opposite side portions of the leading edge of the uppermost one of the film sheets S is depressed by the suction pads 12 corresponding to the outer cams 52b, only the uppermost one of the film sheets S can be positively sucked up by the suction mechanism.

Figure 11D:
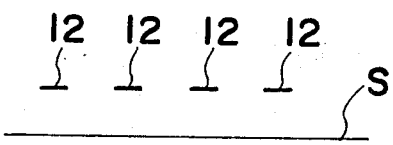

Thereafter, when the inner cams 52a and the outer cams 52b are further rotated through 90° in the direction of the arrow a, points a4 and b4 lying on the outer peripheral faces of the inner cams 52a and the outer cams 52b, respectively, are brought into contact with the rollers 51. Since a section of each of the inner cams 52a, which extends from the point a3 to the point a4, has a constant radius of curvature, the holder plates 36 corresponding to the inner cams 52a are not pivoted, so that the suction pads 12 corresponding to the inner cams 52a are held at the intermediate point of their stroke. On the other hand, since a section of each of the outer cams 52b, which extends from the point b3 to the point b4, has radii of curvature increasing gradually in a path proceeding from the point b3 to the point b4, the holder plates 36 corresponding to the outer cams 52b are pivoted about the shaft 13 in the clockwise direction in FIG. 5, so that the suction pads 12 corresponding to the outer cams 52b are raised to the intermediate point of their stroke as shown in FIG. 11d and thus, the leading edge of the lifted film sheet S is set horizontally.

Figure 11E:
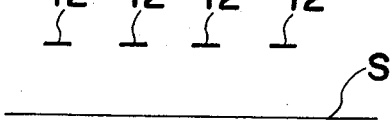

Then, when the inner cams 52a and the outer cams 52b are further rotated through 90° in the direction of the arrow a so as to effect one complete rotation, the points a1 and b1 are brought into contact with the rollers 51, so that all the suction pads 12 are positioned at the upper limit of their stroke as shown in FIGS. 11e and 6. Namely, upon one complete rotation of the inner cams 52a and the outer cams 52b and through the sucking operation of the air cylinder 11, the leading edge of the uppermost one of the film sheets S is horizontally raised up to the upper limit of the stroke of the suction pads 12.

When this state where the leading edge of the uppermost one of the film sheets S is raised up to the upper limit of the stroke of the suction pads 12 is detected by a proper sensor means, the one-way clutch of the gear 66 is turned on so as to rotate the cams 65 in the direction of the arrow d. Thus, since contact points of each of the rollers 63 with respect to each of the cams 65 are displaced from a point c1 to a point c2 (FIG. 10), the frames 61 are pivoted about the shaft 62 in the direction opposite to that of the arrow c such that the feed rollers 14 grip therebetween the leading edge of the lifted film sheet S. At the same time, the one-way clutch of the gear 50 is turned off, so that the piston rods 42 are returned in the direction of the arrow b and thus, the negative-pressure state in the suction pads 12 is cancelled.

The feed rollers 14 are rotated simultaneously with the start of the above described displacement of the contact points of each of the rollers 63 with respect to each of the cams 65 from the point c1 to the point c2. As soon as the feed rollers 14 grip therebetween the leading edge of the film sheet S, the feed rollers 14 carry onto the support plate 15 the film sheet S which is not subjected to suction of the suction pads 12 any more. The cams 35 effect one complete rotation during each feeding operation of the film sheet S. As the contact points of each of the rollers 63 with respect to each of the cams 65 are displaced from the point c2 to the point c1, the feed rollers 14 feed the film sheet S forwardly while being moved forwardly, i.e., in the direction of the arrow c. Meanwhile, rotation of the feed rollers 14 is stopped at the time when the film sheet S has been fed onto the support plate 15. The above described stopping of rotation of the feed rollers 14 is performed so as to prevent, as much as possible, unstable transport of the film sheet S due to its vibration resulting from drive of the feed rollers 14.

In the above described operations of the suction mechanism and the feed mechanism, the uppermost film sheet S is positively lifted up one sheet at a time from the film sheets S stacked in the supply cassette 10 by the suction mechanism through time lag in upward movements of the suction pads 12 so as to be fed onto the support plate 15 by the feed mechanism. In this embodiment, the upward and downward movements of the suction pads 12 are controlled in accordance with the configurations of the inner cams 52a and the outer cams 52b. However, if the feed rollers 14 are capable of gripping therebetween the leading edge of the film sheet S disposed at the intermediate point (FIG. 11d) of the stroke of the suction pads 12, the operation of FIG. 11e can be deleted. In this case, each of the inner cams 52a and the outer cams 52b is so formed as to have three outer peripheral sections extending at intervals of 120°, repectively. In the case where the intermediate point of the stroke of the suction pads 12, to which the leading edge of the film sheet S is lifted by the suction pads 12, is quite different from a height of the sheet transport path defined by the feed rollers 14, the operation of FIG. 11e is effectively performed as in this embodiment. Namely, when the intermediate point of the stroke of the suction pads 12 is set at as high a position as possible in FIG. 11c, the uppermost film sheet S is effectively sucked up from the stack of the film sheets S. However, at this time, since the central portion of the film sheet S is raised high to a large extent, the opposite side portions of the film sheet S are shifted towards the suction pads 12 corresponding to the inner cams 52a, so that the leading edge of the film sheet S is in a wavy state when the suction pads 12 corresponding to the outer cams 52b lift up the film sheet S through suction thereof, whereby such an undesirable phenomenon may take place that the feed rollers 14 are not capable of gripping therebetween the film sheet S properly. In this embodiment, in order to eliminate such waviness of the film sheet S, the suction pads 12 are once stopped at the intermediate point between the lower limit and the upper limit of the stroke of the suction pads 12.

It should be noted that the sucking operations of the suction mechanism and the feed operations of the feed mechanism are controlled by a sequence circuit or a microcomputer through a combination of signals of a print switch, timers, etc. and these control devices are provided in the control cabinet 26 together with other control components for the push lever 16, the stopper 18, etc.

The suction mechanism of the image recording apparatus P can be modified in various ways. For example, it can be so modified that the suction pads 12 are moved upwardly and downwardly by another drive means in place of the inner cams 52a and the outer cams 52b. It an be also be modified such that the suction pads 12 corresponding to the outer cams 52b are initially lifted and then, the suction pads 12 corresponding to the inner cams 52a are lifted. It is needless to say that the number of the suction pads 12 is not restricted to four. Furthermore, it can also be arranged such that the feed rollers 14 of the feed mechanism are moved horizontally without being moved in the arcuate path so as to grip therebetween the leading edge of the film sheet S. The suction mechanism and the feed mechanism of the image recording apparatus P can be applied to a laser beam printer, an X-ray camera for medical use, etc.

Consequently, in the suction mechanism of the image recording apparatus P, since the suction pads sucking the leading edge of the film sheet are upwardly moved through a time lag between the opposite outer suction pads and the inner suction pads, the uppermost film sheet can be positively sucked up one sheet at a time from even a stack of the film sheets held in close contact with one another.

Furthermore, in the feed mechanism of the image recording apparatus P, since the suction mechanism is not required to be moved but the feed rollers are moved so as to grip therebetween the leading edge of the film sheet, the arrangement for moving the feed rollers can be made compact in size and simple in structure as compared with conventional arrangements for moving the suction mechanism. In addition, since the feed rollers are moved in the feed direction of the film sheets while being rotated so as to feed the film sheet onto the support plate, the film sheet can be fed more rapidly than in the case where the feed rollers are fixedly provided, whereby the printing speed of the image recording apparatus can be increased.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A transport mechanism for transporting a photosensitive film sheet for use in an image recording apparatus including a supply means for supplying said photosensitive film sheet to said transport mechanism, said transport mechanism comprising:

an auxiliary scanning drum which is rotated at a constant speed;

said image recording apparatus effecting, by using laser beams, main scanning of image signals on said photosensitive film sheet which is being transported on said auxiliary scanning drum at the constant speed;

a nip roller in contact with said auxiliary scanning drum and rotated by said auxiliary scanning drum;

a substantially horizontal support plate, extending in a sheet transport path from said supply means to said auxiliary scanning drum, for slidably supporting said photosensitive film sheet thereon;

a push lever disposed at one end of said support plate adjacent to said supply means and movably mounted for projecting into and retracting away from said sheet transport path, whereby said push lever urges a trailing edge of said photosensitive film sheet towards said auxiliary scanning drum when said push lever is projected into said sheet transport path; and a stopper disposed at the other end of said support plate adjacent to said auxiliary scanning drum and movably mounted for projecting into and retracting away from said sheet transport path, whereby said stopper positions a leading edge of said photosensitive film sheet when said stopper is projected into said sheet transport path; whereby said photosensitive film sheet which is supplied from said supply means onto said support plate is displaced by said push lever and positioned on said support plate through contact of said leading edge with said stopper when said push lever is initially projected into said sheet transport path; and said photosensitive film sheet thus positiond on said support plate is displaced by said push lever and gripped, at said leading edge, between said auxiliary scanning drum and said nip roller when said stopper is retracted and said push lever is again projected into said sheet transport path.

2. A transport mechanism as claimed in claim 1, wherein said push lever is pivotally mounted on a first shaft for pivoting said push lever into and out of said sheet transport path and said stopper is pivotally mounted on a second shaft for pivoting said stopper into and out of said sheet transport path.

3. A transport mechanism as claimed in claim 2, wherein said push lever and said stopper are disposed above said support plate.

4. A transport mechanism as claimed in claim 2, wherein said push lever and said stopper are disposed below said support plate.

5. A transport mechanism as claimed in claim 2, wherein said stopper includes a hooked end portion for engaging said leading edge of said photosensitive film sheet which is brought into contact with said hooked end portion when said push lever is initially projected into said sheet transport path.

6. A transport mechanism as claimed in claim 3, wherein said stopper includes a hooked end portion for engaging said leading edge of said photosensitive film sheet which is brought into contact with said hooked end portion when said push lever is initially projected into said sheet transport path.

7. A transport mechanism as claimed in claim 4, wherein said stopper includes a hooked end portion for engaging said leading edge of said photosensitive film sheet which is brought into contact with said hooked end portion when said push lever is initially projected into said sheet transport path.

8. A transport mechanism as claimed in claim 1, wherein said image recording apparatus is a laser beam printer.

9. A transport mechanism as claimed in claim 1, wherein said image recording apparatus is an X-ray camera for medical use.

* * * * *